(12) United States Patent
Scrivner et al.

(10) Patent No.: US 9,961,832 B2
(45) Date of Patent: May 8, 2018

(54) CONTROL OF BASE CUTTER ORIENTATION IN SUGARCANE HARVESTERS

(71) Applicant: DEERE & COMPANY, Moline, IL (US)

(72) Inventors: John P. Scrivner, Thibodaux, LA (US); Eric P. Richard, Thibodaux, LA (US); Kerry J. Morvant, Thibodaux, LA (US); Marlin L. Goodnight, Thibodaux, LA (US); Dusk S. Mixon, Saint Amant, LA (US)

(73) Assignee: Deere & Company, Moline, IL (US)

( * ) Notice: Subject to any disclaimer, the term of this patent is extended or adjusted under 35 U.S.C. 154(b) by 428 days.

(21) Appl. No.: 14/670,162

(22) Filed: Mar. 26, 2015

(65) Prior Publication Data

US 2015/0362904 A1   Dec. 17, 2015

Related U.S. Application Data

(60) Provisional application No. 62/012,115, filed on Jun. 13, 2014.

(51) Int. Cl.
*G05B 19/18* (2006.01)
*A01D 45/10* (2006.01)
*A01D 41/127* (2006.01)

(52) U.S. Cl.
CPC ........... *A01D 45/10* (2013.01); *A01D 41/127* (2013.01)

(58) Field of Classification Search
CPC .................................................... A01D 45/10
See application file for complete search history.

(56) References Cited

U.S. PATENT DOCUMENTS

| 8,452,501 | B1* | 5/2013 | Lange | A01D 41/141 56/13.6 |
| 2008/0155953 | A1* | 7/2008 | Cleodolphi | A01D 45/10 56/10.2 E |
| 2012/0110968 | A1 | 5/2012 | Hinds | |
| 2015/0124054 | A1* | 5/2015 | Darr | G01F 22/00 348/46 |
| 2016/0135365 | A1* | 5/2016 | Cleodolphi | A01D 34/006 56/10.2 E |

OTHER PUBLICATIONS

John Deere 3520 Sugarcane Harvester—Overview, Copyright 2015, Admitted Prior Art.
CNH America LLC, Case Sugarcane Harvester Austoft 8000 Series Brochure, Copyright 2010, Admitted Prior Art.

* cited by examiner

*Primary Examiner* — Kimberly S Berona
*Assistant Examiner* — Anshul Sood
(74) *Attorney, Agent, or Firm* — Lorenz & Kopf, LLP (57) ABSTRACT

A method and control system are disclosed for orientating base cutters of a sugarcane harvester. A sugarcane harvester may include a crop divider, a rear base cutter, and a front base cutter. An indicator of a position of the crop divider may be determined. A target orientation of the front base cutter may be determined based upon the position indicator. The front base cutter may be adjusted with respect to a chassis of the harvester, in order to place the front base cutter in the target orientation. If adjusting the front base cutter includes moving the front base cutter beyond a predetermined range of motion, the rear base cutter may be adjusted with respect to the ground.

20 Claims, 7 Drawing Sheets

CONTROL OF BASE CUTTER ORIENTATION IN SUGARCANE HARVESTERS

CROSS-REFERENCE TO RELATED APPLICATION(S)

This application claims priority under 35 U.S.C. § 119 to U.S. Provisional Application No. 62/012,115, filed Jun. 13, 2014, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates to sugarcane harvesters, including control of the orientation of one or more base cutter assemblies.

BACKGROUND OF THE DISCLOSURE

Harvesters of various types, including sugarcane harvesters, may include harvesting devices of various types. Harvesting devices for a sugarcane harvester, for example, may include assemblies for cutting, chopping, sorting, transporting, and otherwise gathering and processing sugarcane plants. Typical harvesting devices include base cutters assemblies (or "base cutters"), feed rollers, cutting drums, and so on. In various harvesters, harvesting devices may be hydraulically powered by an engine-driven (or other) pump.

To actively harvest crops, a harvester may move along a field with harvesting devices engaged, the harvesting devices gathering and processing material from rows of crop plants. In the case of sugarcane harvesters, gathered sugarcane stalks may be chopped into billets for delivery to a trailing wagon, while leaves and trash may be separated from the billets and ejected into the field.

It may be useful to orient the base cutter(s) of a base cutter in relative close proximity to the ground during harvesting operations. This may, for example, help to ensure that sugarcane plants are cut by the base cutter at a location that is relatively close to the ground, resulting in less waste. Further, in certain instances, rotating disks, paddles, and so on that may be included in various base cutters. The rotation of these components may help to lift already cut sugarcane off of the ground. Accordingly, relative close proximity of the base cutter(s) to the ground (and other devices) may also allow for more effective lifting and routing of sugarcane plants.

With traditional harvester designs, however, executing harvesting operations with base cutter(s) in relative close proximity (s) to the ground may increase the likelihood of various undesirable effects. For example, rises, bumps or other uneven topography in a particular field may result in impacts between the base cutters and the ground. This may result in damage to the base cutters. Further, base cutters oriented too closely to the ground may tend to entrain increased quantities of dirt and other trash into the stream of cut sugarcane, increasing the load on the harvester's feed train and the potential for chokes, jams, or other interruptions to harvesting.

SUMMARY OF THE DISCLOSURE

A method and a control system are disclosed for controlling base cutter orientation in a sugarcane harvester. According to one aspect of the disclosure, a sugarcane harvester may include a crop divider, a rear base cutter, and a front base cutter. An indicator of a position of the crop divider may be determined. A target orientation of the front base cutter may be determined based upon the position indicator. The front base cutter may be adjusted with respect to a chassis of the harvester, in order to place the front base cutter in the target orientation. If adjusting the front base cutter includes moving the front base cutter beyond a predetermined range of motion, the rear base cutter may be adjusted with respect to the ground. Various front base cutters may be oriented independently of each other.

In certain embodiments, the crop divider may be mounted to the chassis with a ground-tracking assembly, whereby the crop divider moves with respect to the chassis during operation of the harvester in order to track ground contours under the crop divider. A ground speed for the harvester may be determined, and a projected ground height under the front base cutter determined based upon the ground speed and the tracked ground contours.

In certain embodiments, the rear base cutter may be rigidly mounted to the chassis. As such, adjusting the rear base cutter with respect to the ground may include moving the chassis with respect to ground.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed control system and method for controlling the orientation of one or more base cutters, as shown in the accompanying figures of the drawings described briefly above. Various modifications to the example embodiments may be contemplated by one of skill in the art.

As noted above, it may be useful to maintain relatively close proximity between one or more base cutter assemblies ("base cutters") of a sugarcane harvester ("harvester") and the ground of a field being harvested by the harvester. In existing systems, however, this may tend to increase the likelihood of ground impacts, entrainment of soil into the feed train of the harvester, chokes and jams of harvester machinery, and so on.

It may also be useful to control the orientation of a base cutter with respect to other harvesting devices, such as other base cutters. Various harvester, for example, may include front and rear base cutters. In certain instances, the front base cutters may serve primarily to cut the sugarcane from the ground, whereas the rear base cutters may serve primarily to receive cut sugarcane from the front base cutters and direct the sugarcane into a first set of feed rollers in a feed train. Appropriate alignment of the front and rear base cutters may provide effective routing of sugarcane into the feed train as well as prevent double cuts of the sugarcane.

Among other benefits, the disclosed control system and method may assist in aligning base cutters with respect to the ground and to other harvesting devices. The disclosed system and method may include, for example, tracking the ongoing movement of a harvester's crop dividers, with respect to the ground and, based on this tracking, actively positioning two sets of base cutters. This may be useful for promoting close, single cuts of sugarcane and avoiding ground impacts by the base cutters. It may also assist in improved routing of cut sugarcane into the initial feed rollers of the harvester's feed train.

In certain implementations, a controller carried by the harvester may monitor movement of a crop divider on each side of the harvester in order to determine the ground height under each crop divider (e.g., at a toe of the crop divider). Based upon the determined height, the controller may determine a target orientation of a base cutter (e.g., a front base cutter) relative to the ground, and direct adjustment of the current orientation of the base cutter accordingly.

In certain implementations, multiple base cutters may be controlled. In certain configurations, for example, a front base cutter may be pivotally mounted to a chassis of a harvester (e.g., supported by a pivoting arm). A rear base cutter may be rigidly mounted to the chassis (e.g., bolted to the chassis at a predetermined orientation). Based upon a tracked orientation of a crop divider (or crop dividers), a target orientation for one or both of the base cutters may be determined and appropriate adjustments made.

In certain implementations, the orientation of a first base cutter may be changed with relatively fine adjustments, and the orientation of another base cutter, as well as the orientation of the first base cutter, may be changed with a relatively coarse adjustments. For example, in the example configuration noted above, the front base cutter may be pivoted with respect to the chassis of the harvester in order to implement relatively fine adjustment of the orientation of the front base cutter with respect to the ground and with respect to the rear base cutter. As appropriate, the chassis itself may then be re-oriented (e.g., pivoted about a rear axle of the harvester) in order to adjust the orientation of both base cutters with respect to the ground.

As will become apparent from the discussion herein, the disclosed system and method may be used advantageously in a variety of ways. In certain embodiments, referring now to FIG. 1, the disclosed system and method may be implemented with regard to a sugarcane harvester 20. It will be understood, however, that the disclosed system and method may be used for various other vehicles or non-vehicle platforms, including various sugarcane harvesters of different configurations or designs than the sugarcane harvester 20 of FIG. 1.

Figure 1:
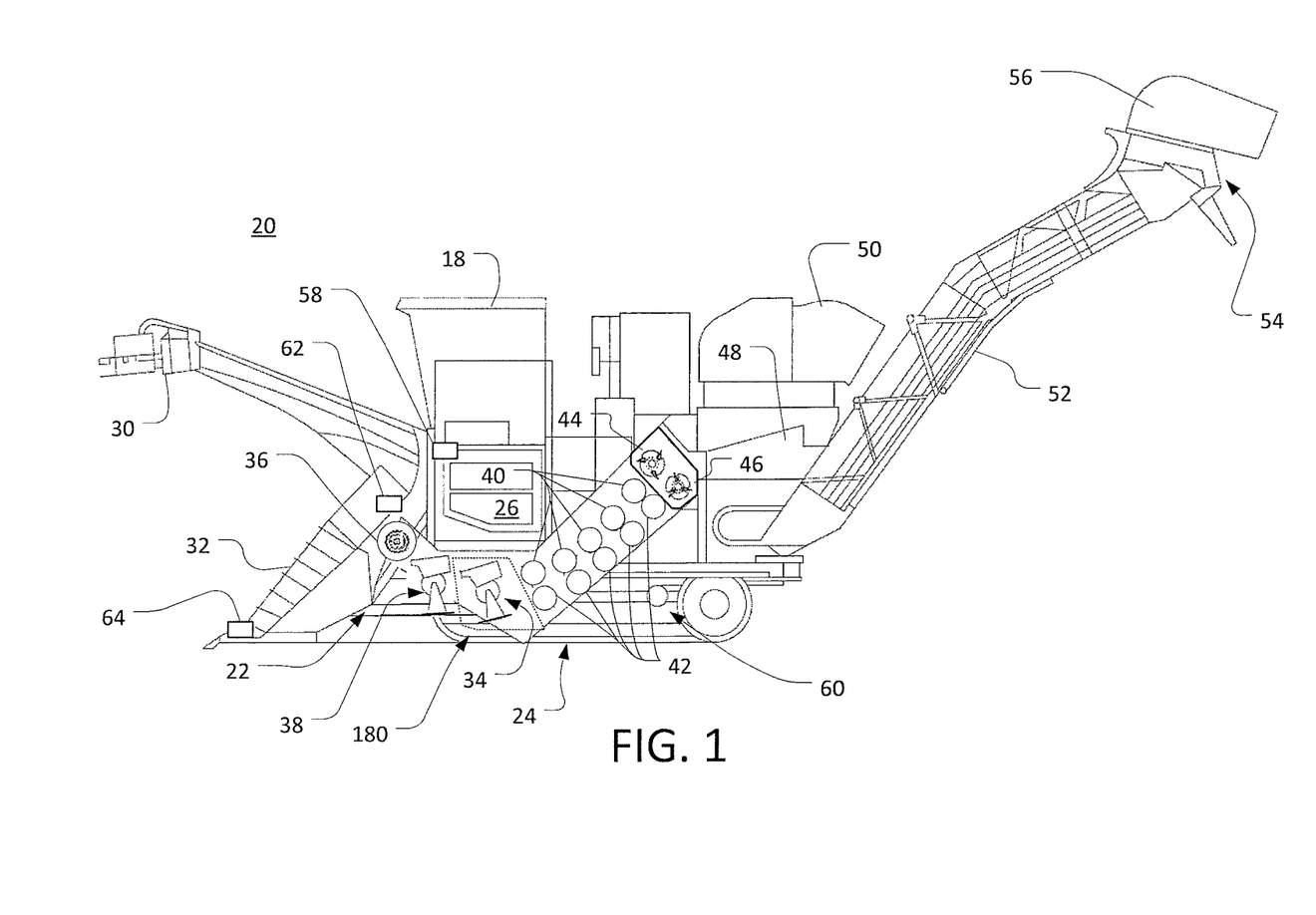
FIG. 1 is a side view of an example sugarcane harvester with a base cutter control system.

The harvester 20 is presented in a side view in FIG. 1, with the front of the harvester 20 facing to the left. Accordingly, certain right-side components of the harvester 20 are not be visible in FIG. 1. The harvester 20 may include a cab 18 to seat an operator, as well as a chassis 22, supporting various cutting, routing and processing devices. In certain embodiments, the chassis 22 may be supported by a transport frame such as track frame 60 supporting track assemblies 24. Other harvesters may include wheels supported by axle assemblies (not shown). An engine 26 may supply power for driving the harvester along a field and for powering various driven components of the harvester 20. In certain embodiments, the engine 26 may directly power a main hydraulic pump (not shown). Various driven components of the harvester 20 may be powered by hydraulic motors (not shown) receiving hydraulic power from the main hydraulic pump via one or more hydraulic loops (not shown).

A cane topper 30 may extend forward of the chassis 22 in order to remove the leafy tops of sugarcane plants (not shown), and a set of crop dividers (e.g., left-side divider 32 shown in FIG. 1) may guide the remainder of the sugarcane toward internal mechanisms of the harvester 20 for processing. As the harvester 20 moves across a field, plants passing between the crop dividers 32 may be deflected downward by a knockdown roller 36 before being cut near the base of the plants by one of base cutters 34 and 38. The crop dividers 32 and the base cutters 34 and 38 may be supported by the chassis 22 in various ways.

Rotating disks, guides, or paddles (not shown) on the front base cutter 38 and the rear base cutter 34 may further direct the cut ends of the plants upwardly and rearward within the harvester 20 into a feed train for further transport and processing. For example, sugarcane cut by one of the base cutters 34 or 38 may be passed by the base cutters 34 or 38 toward successive pairs of upper and lower feed rollers 40 and 42 supported by the chassis 22. The feed rollers 40 and 42 may then rotate in order to convey the stalks toward chopper drums 44 and 46 for chopping into relatively uniform billets. In certain embodiments, the feed rollers 40 and 42 may be included in a hydraulic circuit such that the feed rollers 40 and 42 may be rotatably driven by a hydraulic motor or other device (not shown).

The chopper drums 44 and 46 may rotate in opposite directions, with respect to each other, in order to chop the passing stalks into billets and propel the billets into a cleaning chamber 48 at the base of a primary extractor 50. The primary extractor 50 may utilize a powered fan to extract trash and debris from the cleaning chamber 48, while allowing the billets of sugarcane stalks to drop onto a loading elevator 52 with a forward end located at the bottom of the cleaning zone 48. The loading elevator 52 may then convey the cleaned billets upward to a discharge location 54, below a secondary extractor 56, where the billets may be discharged into a trailing truck or other receptacle (not shown).

As also noted above, various devices within the harvester 20 may be driven via hydraulic (or other) motors that are indirectly powered by the engine 26. For example, rotation of the cutting blades of the base cutter 34 may be driven by one or more hydraulic motors (not shown) on a closed-loop base cutter hydraulic circuit (not shown), which may in turn be powered by the main hydraulic pump (not shown) driven by the engine 26. The hydraulic circuit for the base cutter 34 may be distinct from the hydraulic circuit for other harvesting devices (e.g., the feed rollers 40 and 42 or other devices).

As another example, rotation of the chopper drums 44 and 46 may be driven by one or more hydraulic motors (not shown) on a closed-loop chopper drum hydraulic circuit (not shown), which may in turn be powered by the man hydraulic pump (not shown) driven by the engine 26. The hydraulic circuit for the chopper drums 44 and 46 may be distinct from the hydraulic circuit for other harvesting devices (e.g., the feed rollers 40 and 42, the base cutter 34, or other devices).

In certain embodiments, various sensors and related devices may be utilized. For example, one or more position (or height) sensors 62 and 64 may be oriented at or near the crop dividers 32 in order to assist in tracking the orientation of the crop divider 32 with respect to the ground or to the chassis 22 of the harvester 20. The sensors 62 and 64 may be configured in various ways and may be in communication with various other devices associated with the harvester 20. Separate sensors 62 or 64 may be utilized to separately track the orientation of separate (e.g., right and left) crop dividers 32. In certain embodiments, various other sensors and sensor types may additionally (or alternatively) be utilized.

In certain embodiments, one or more control devices, such as controller 58, may be included in (or otherwise associated with) the harvester 20. The controller 58, for example, may include one or more computing devices including various processor devices and various associated memory architectures. In certain embodiments, the controller 58 may additionally (or alternatively) include various other control devices such as various electro-hydraulic valves and hydraulic circuits, various electronic control circuits and devices (e.g., various power electronics devices), and so on. In certain embodiments, the controller 58 (or another control device) may be in communication with various switches, controls and other interfaces or input devices (not shown) in the cab 18, as well as with various sensors, actuators, or other devices (not shown in FIG. 1) distributed throughout the harvester 20. For example, the controller 58 may be in communication with the position sensors 62 and 64, wheel speed sensors (not shown), engine speed sensors (not shown), and so on. In certain embodiments, the controller 58 (or another control device) may be a remotely located from the harvester 20 and may communicate with various devices and systems of the harvester 20 via wireless or other communication means.

Figure 2:
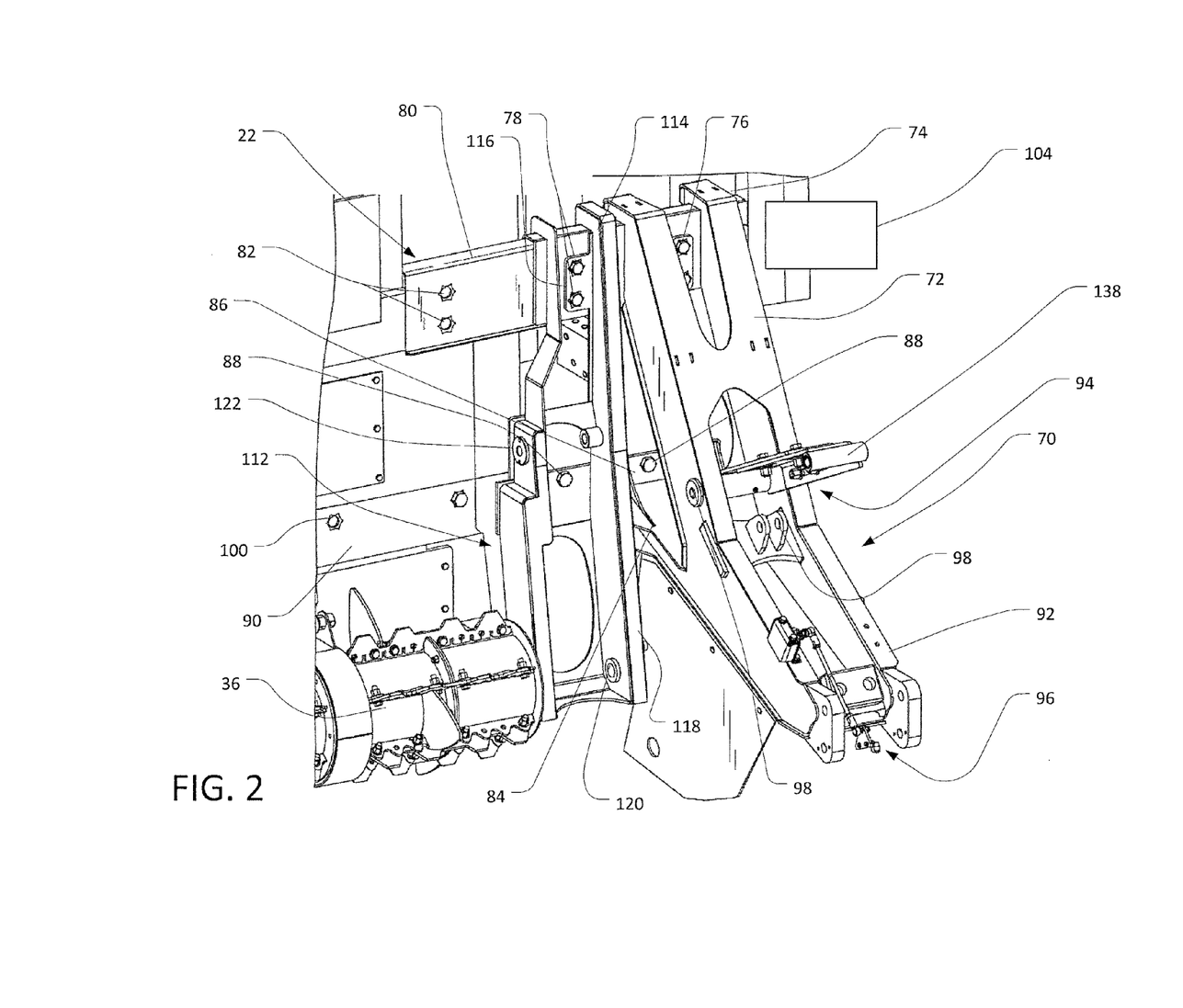
FIG. 2 is a partial perspective view of support modules attached to a chassis of the harvester of FIG. 1.

The crop dividers 32 may be supported with respect to the chassis in a number of ways. In certain embodiments, the crop dividers 32 may be supported on removable modules, such that the orientation of the crop dividers 32 with respect to the chassis 22 may be easily configurable. Referring also to FIG. 2, various mounting structures may be attached to (or formed as part of) the chassis 22 in order to provide a variety of mounting locations for the crop dividers 32. For example, an upper mounting structure 80 and a lower mounting structure 90, each constructed of formed and welded metal plates, may be bolted or welded to the chassis 22. A variety of sleeves 82 and 100 may extend through the mounting structures 80 and 90, the sleeves 82 and 100 (or others) being configured to receive various bolts 76, 78, and 88 (or other attachment devices). Other devices for mounting components to the mounting structures 80 and 90 may additionally (or alternatively) be utilized, including various clips, latches, hooks, bolt holes, and so on. The locations of the sleeves 82 and 100 along the structures 80 and 90 (or the locations of other mounting devices) may be viewed as "mounting locations." As can be seen from the location of the various bolts 76, 78 and 88 and sleeves 82 and 100 in FIG. 2, the various mounting locations for the mounting structures 80 and 90 may be spaced laterally apart from each other. The sleeves 82 and 100 (or other mounting devices) may accordingly provide for a relatively rigid connection between various support modules (as discussed below) and the chassis 22, in each of various possible configurations.

As depicted in the various figures, the mounting structures 80 and 90 may extend laterally across the full width of the chassis 22. In certain embodiments, it may be appropriate to include mounting structures that do not extend across the full width of the chassis 22. For example separate right- and left-side mounting structures (not shown) may be utilized.

One or more crop divider support modules 70 (e.g., one module 70 for each side of the harvester 20) may be utilized to in order to support the crop dividers 32 in a configurable manner. The support modules 70 may be attached to the mounting structures 80 and 90 at various of the different mounting locations, depending on the desired orientation of the modules 70. In this way, the support modules 70 may be supported at various discreet and laterally separated orientations with respect to the chassis 22. In certain embodiments, the support modules 70 may be attached to the mounting structures 80 and 90 by way of various bolts 76, 78 and 88 secured through a particular set of sleeves 82 and 100, which may correspond to a particular orientation of the modules 70. This may be useful, for example, in order to harvest sugarcane fields with different row spacings and in various other settings. This may also improve durability and reliability of the modular system.

In the embodiment depicted, the support modules 70 may be attached to the chassis 22 using laterally outer mounting locations for wider row spacing (e.g., 1.5 m rows) and may be attached to the chassis 22 using laterally inner mounting locations for narrower rows (e.g., 0.9 m rows). Other spacings and mounting locations may also be possible.

Figure 3A:
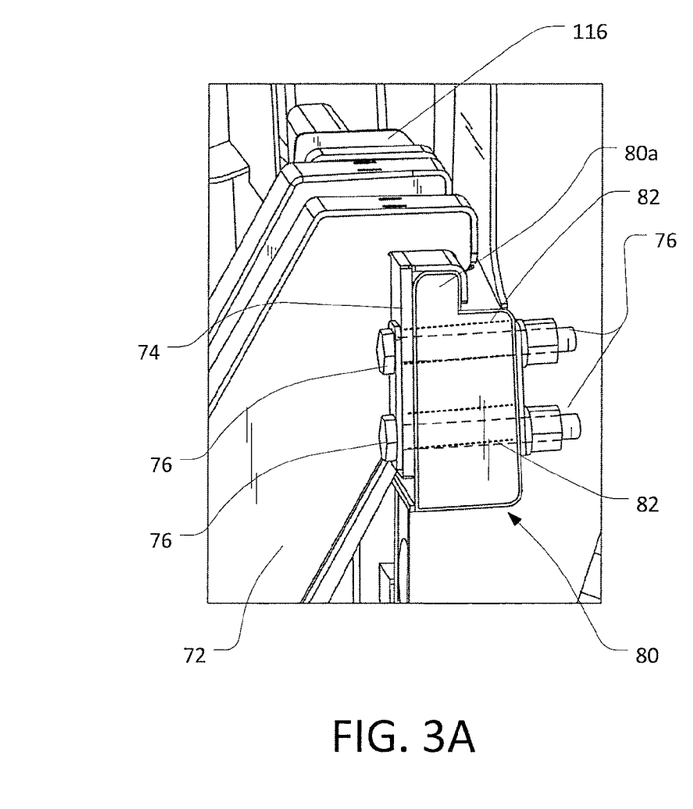
FIGS. 3A and 3B are enlarged partial perspective views of the attachment of a first support module of FIG. 2 to the chassis.

In certain embodiments, support module 70 may exhibit a generally y-shaped profile, with an upper mounting arm 72, a lower mounting arm 84, and a support arm 92 connected to the two mounting arms 72 and 84. Various known techniques (e.g., I-beam profiles, cross-supports, and so on) may be used to provide suitable strength and rigidity to the various arms 72, 84, and 92, and to the support module 70 as a whole. The upper mounting arm 72 may include, at an upper end, a mounting bracket 74, or a similar attachment structure or mechanism. In the embodiment depicted, referring also to FIG. 3A, the mounting bracket 74 may include a hooked portion, which may seat on an upper tab 80*a* of the mounting structure 80 when the support module 70 is attached to the chassis 22. In order to attach the upper mounting arm 72 to the mounting structure 80, with the mounting bracket 74 appropriately aligned with the mounting structure 80, various bolts 76 and 78 may be secured through various sleeves 82.

Figure 3B:
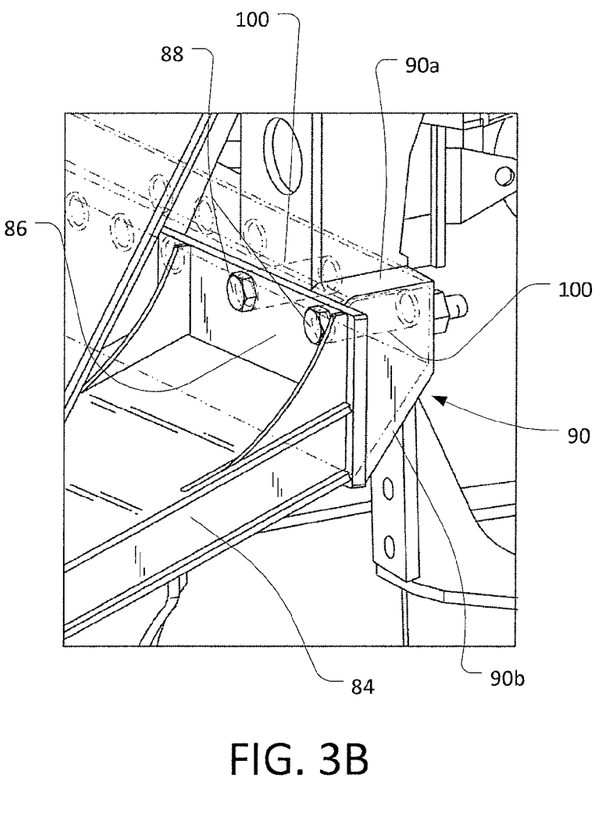

Referring also to FIG. 3B, the lower mounting arm 84 may include, at an upper or rearward end, a mounting bracket 86 or a similar attachment structure or mechanism. In the embodiment depicted, the mounting bracket 86 may be configured to seat against a forward portion of the mounting structure 90. Various bolts 88 may then be secured through various sleeves 100, in order to attach the lower mounting arm 84 to the mounting structure 90.

In order to mount the support module 70 to the chassis 22 of the harvester 20 in a variety of configurations, an operator may lift the support module 70 to seat the upper mounting bracket 74 on the upper mounting structure 80. This may cause the natural moment of the support module 70 to urge the lower mounting bracket 86 against the lower mounting structure 90. The operator may then align the support module 70 with the appropriate set of mounting locations and secure the module 70 to the both of the mounting structures 80 and 90. As noted above, in this way an operator may configure various support modules 70 (e.g., each of left- and right-side support modules 70) to support the associated crop dividers 32 in various orientations.

Figure 4:
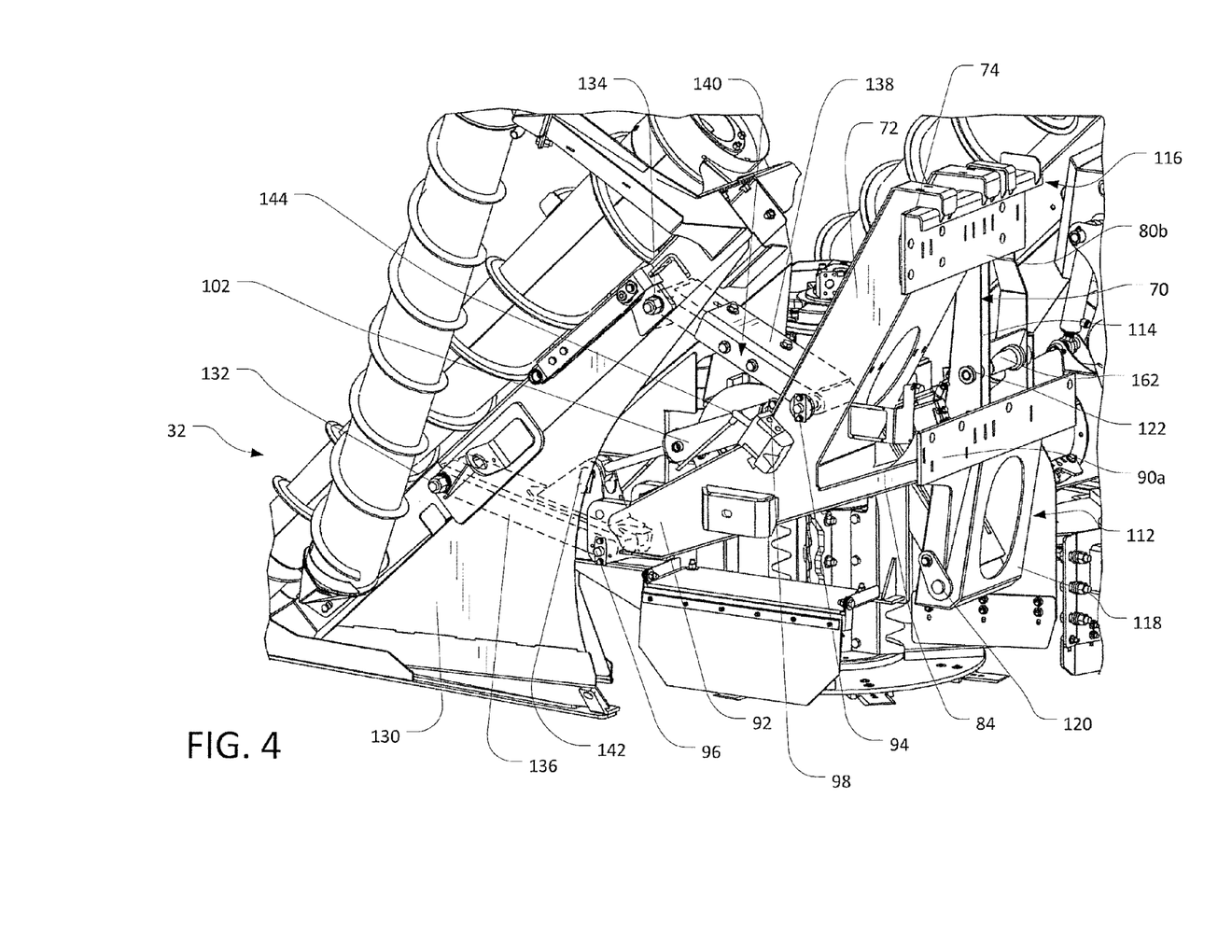
FIG. 4 is a partial perspective view of a crop divider and crop divider support attached to the first support module of FIG. 2.

The crop dividers 32 may be supported by the support modules 70 in various ways. In certain embodiments, referring also to FIG. 4, the crop dividers 32 may be configured to move with respect to the support modules 70 and the chassis 22. In the embodiment depicted, the crop divider 32 may be supported with respect to the support module 70 by a four-bar linkage assembly. Each support module 70, for example, may include pivot mounts 94 and 96, for indirect (or direct) attachment of the crop dividers 32. Various links 136 and 138 may be mounted to the pivot mounts 94 and 96, as well as to pivot mounts 132 and 134 on a frame 130 for the associated crop divider 32. In certain embodiments, the length of one or more of the links 136 and 138 may be adjustable in order to adjust the range of movement of the crop divider frame 130 (and the crop divider 32) with respect to the support module 70 and the chassis 22. For example, the link 138 may include a slot and bolt assembly 140, by which the length of the link 138 may be adjusted. It will be understood that various other support arrangements (e.g., lever arrangements, other linkages, and so on) may be utilized.

In certain embodiments, a ground-tracking assembly for the crop dividers 32 may help to maintaining appropriate contact between the crop dividers 32 and the ground of a particular field. For example, a hydraulic (or other) system may be provided in order to actuate or otherwise control movement of the crop dividers 32 in response to the contours of the ground. In the embodiment depicted, an actuator mount 142 may be provided on the link 136, and a corresponding actuator mount 98 may be provided on the support module 70. An actuator (e.g., hydraulic actuator 102) may be attached to each of the mounts 142 and 98, such that extension or retraction of the cylinder of the actuator 102 may move the crop divider frame 130 along a path defined by the links 136 and 138.

In certain embodiments, various control strategies may be utilized for a ground-tracking assembly. For example, a target pressure (or pressure range) may be determined for the hydraulic actuator 102, which may correspond to an appropriate pressure (or range of pressures) on the ground. A pressure transducer (not shown) may be utilized to monitor the actual pressure on the actuator 102, which may vary depending on the force of contact between the crop dividers 32 and the ground. If changes in terrain (e.g., rises or ridges in the field) urge the crop divider 32 upward such that the system pressures exceed the target pressure (or pressure range), a pump (not shown) may be activated to move the crop divider 32 (e.g., upward) until the system returns to the target pressure (or range). This may help to ensure that there is appropriate force applied between the ground and the crop divider 32, such that the crop divider 32 neither digs too deeply into the soil nor bounces excessively along the ground. In certain implementations, a look-up table or similar resource or process may be utilized to determine an appropriate target pressure setting based upon the current position of the crop divider 32. For example, a current target pressure may be automatically adjusted whenever the crop divider 32 is re-oriented with the actuator 102 and the links 136 and 138 (e.g., as discussed in greater detail below).

In certain embodiments, a position sensor 144 (e.g., a linear, rotary or other sensor) may be utilized to monitor the relative orientation of the crop divider frame 130 and the crop divider 32, with respect to the crop divider support module 70 and the chassis 22. For example, the position sensor 144 may be attached (not shown) to the lower link 136 in order to detect the relative orientation of the link 136. This information may be provided to a controller (e.g., the controller 58) in order to calculate a current orientation of the crop divider 32 and frame 130 with respect to the chassis 22, the module 70, or the ground.

As noted above, the support module 70 may be supported on the mounting structures 80 and 90 in a number of discreet and laterally separated positions. In certain embodiments, various actuators may be provided to assist in moving the support module 70 (and other modules) between these positions. For example, referring again to FIG. 2, an actuator 104 may be provided. In order to appropriately configure the harvester 20, the actuator 104 may be utilized to move the support module 70 laterally along the upper and lower mounting structures 80 and 90 between various mounting locations. Once aligned with an appropriate mounting location by the actuator 104, the module 70 may then be rigidly secured to the mounting structures 80 and 90 (e.g., via the various bolts 76, 78, and 88 and sleeves 82 and 100). In this way, for example, the actuators 104 may be used to assist in alignment of the support modules 70, but the benefits of discreet, rigid mounting connections may be retained.

Still referring to FIG. 2, in order to support various front base cutters 38 in a configurable manner, one or more base cutter support modules 112 (e.g., one module 112 for each side of the harvester 20) may be provided. Like the crop divider support modules 70, the base cutter support modules 112 may be attached to the chassis at various of the different mounting locations (e.g., through various bolts 76, 78 and 88 secured through various sleeves 82 and 100). In this way, the support modules 112 may be supported at various different discreet and laterally separated orientations with respect to the chassis 22.

In certain embodiments, support module 112 may exhibit a generally extended profile, with a mounting arm 114 extending upward away from a lower support structure 118. A mounting bracket 116 (or similar attachment structure or mechanism) may be attached at the upper end of the mounting arm 114. The mounting bracket 116 may be aligned with appropriate mounting locations on the upper mounting structure 80, and various bolts 78 inserted through various sleeves 82, in order to secure the mounting arm 114 to the mounting structure 80. The support module 112 may be similarly secured to the lower mounting structure 90.

In certain embodiments, the base cutter support module 112 may be configured to attach to the chassis at the same set (or a shared subset) of mounting locations as the crop divider support module 70. As depicted in FIG. 1, for example, the mounting bracket 116 of the support module 112 may be configure to seat on the mounting bracket 74 of the support module 70, such when the two modules 70 and 112 are bolted to the mounting structure 80, the support module 112 is supported by the chassis 22 via the support module 70. In such a configuration, it may be possible to configure the harvester 20 to include or not include the front base cutter 38, as appropriate. For example, the crop divider support module 70 may be located on the mounting structures 80 and 90 at the appropriate mounting locations to provide an chosen orientation (or range of orientations) of the crop dividers 32. As needed, the base cutter support module 112 may be seated on the crop divider support module 70, and the two support modules 112 and 70 rigidly secured to the chassis.

Figure 5:
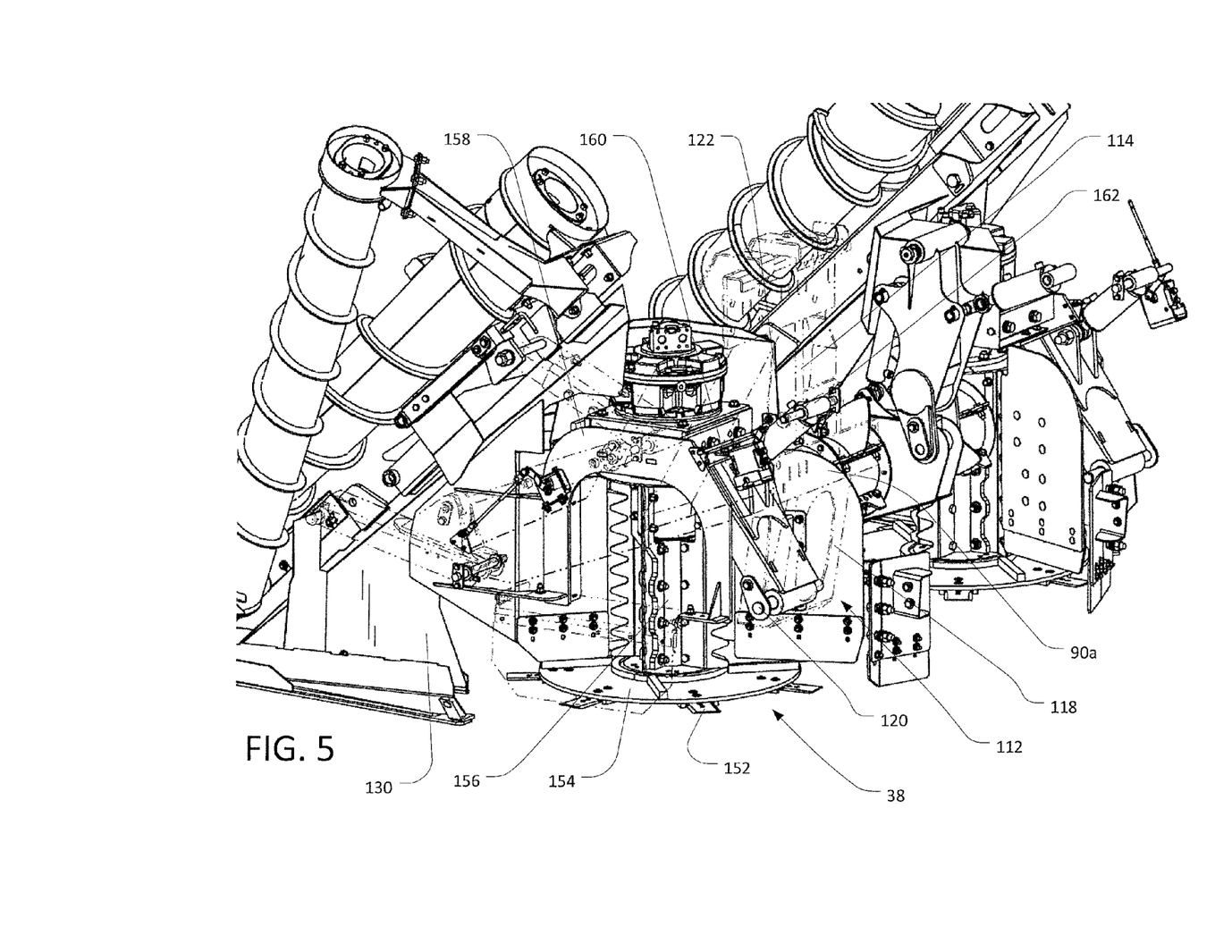
FIG. 5 is a partial perspective view of a base cutter and support arm attached to a second support module of FIG. 2.

Referring also to FIG. 5, the front base cutters 38 may be supported by the support modules 112 in various ways. (For clarity of presentation, various features are represented with phantom lines in FIG. 5.) In certain embodiments, the base cutters 38 may be configured to move with respect to the support modules 112. In the embodiment depicted, each support module 112 may be configured to include pivot mounts 120, for indirect (or direct) attachment of the base cutters 38. A support arm 158 (or other apparatus) may be pivotally mounted to the pivot mounts 120 of the support module 112 at one end of the support arm 158, and may rigidly support one of the base cutters 38 at the other end of the support arm 158. The support arm 158 may pivot about the pivot mounts 120 in order to pivot the base cutter 38 with respect to the chassis 22. It will be understood that various other support arrangements may be utilized, including various slide assemblies, rail and roller assemblies, linear actuators, four-bar and other linkage arrangements, other levers or arms, and so on.

In certain embodiments, a hydraulic (or other) system may be provided in order to actuate or otherwise control movement of the base cutters 38. For example an actuator mount 160 may be provided on the base cutter 38 (e.g., on a support frame (not shown) of the base cutter 38), and a corresponding actuator mount 98 may be provided on the support module 112. A hydraulic (or other) actuator 162 may be attached to each of the mounts 160 and 122, such that extension or retraction of the cylinder of the actuator 162 may move the base cutter 38 along a path defined by the support arm 158. Accordingly, the relative orientation of the base cutter 38 with respect to the ground and the chassis 22 may be adjusted. Correspondingly, movement of the support arm 158 may also adjust the relative angle of various base cutter components, including base cutter blades 152, disk 154, spindle 156, and so on.

Figures 6A, 6B:
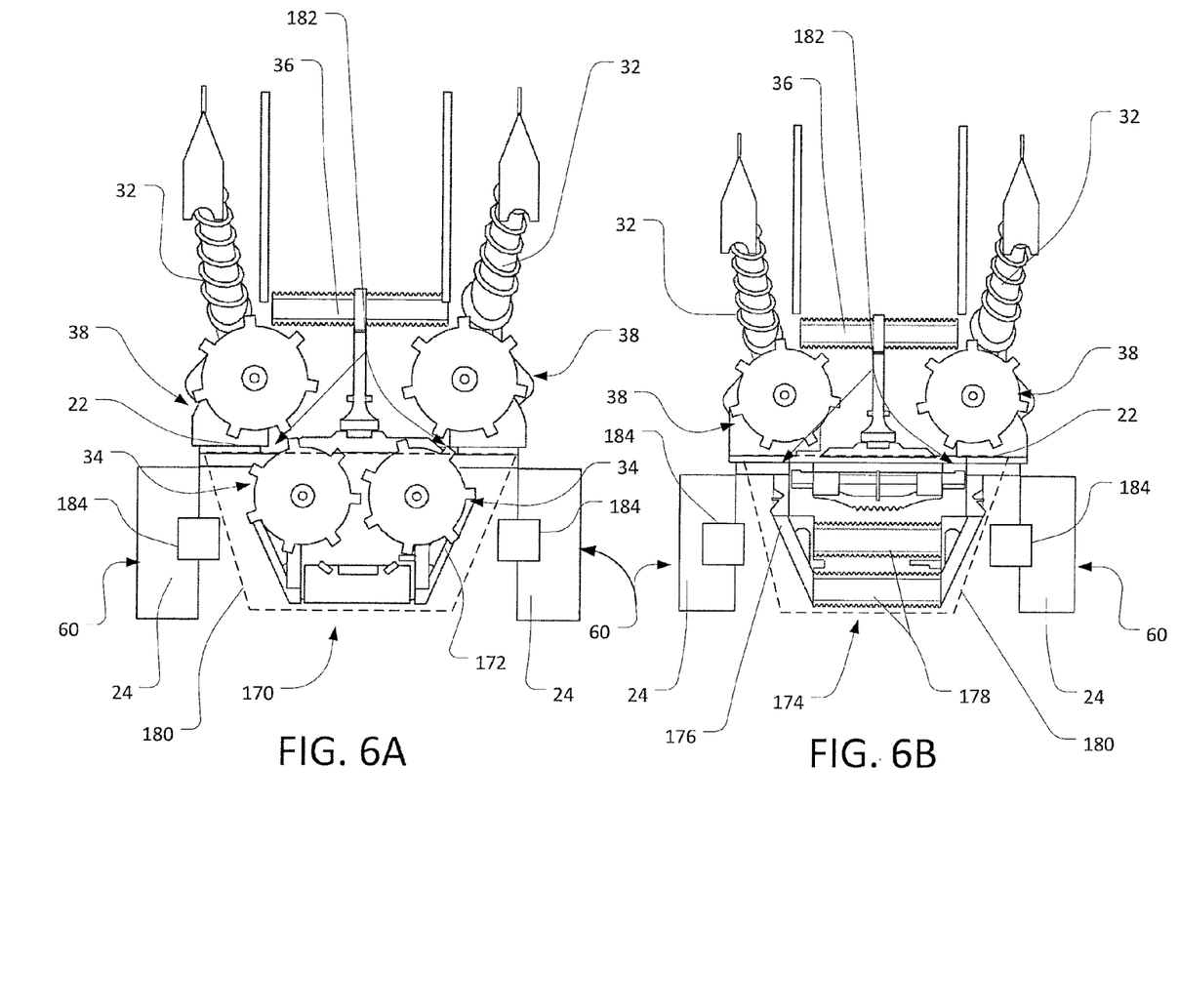
FIGS. 6A and 6B are partial top views of the harvester of FIG. 1, including a module cavity.

Other modules (and combinations of modules) may also be utilized. Referring also to FIGS. 6A and 6B, the harvester 20 may include a set of rear base cutters 34 as well as the set of front base cutters 38. The rear base cutters 34 may be rigidly mounted to the chassis 22 in one of a number predetermined configurations (e.g., with the blades of the base cutters 34 oriented at one of a limited number of different cutting angles with respect to ground), and may not necessarily be adjustable with respect to the chassis during operation of the harvester 20. In certain embodiments, however, the relative orientation the chassis 22 itself may be adjusted, with respect to the ground, during harvester operation. For example, various actuators (not shown) may be utilized to pivot (or otherwise move) the chassis 22 with respect to the track frames 60 and thereby to pivot (or otherwise move) the chassis 22 with respect to the ground. Because the base cutters 34 may be rigidly mounted to the chassis 22, this adjustment of the chassis 22 may also change the orientation of the base cutters 34, with respect to the ground. Further, because the base cutters 38 may be mounted to the chassis via the support modules 112, adjustment of the chassis 22 may also change the orientation of the base cutters 38.

In certain embodiments, it may be useful to provide two sets of base cutters 34 and 38. In other instances, however, only one set of base cutters (e.g., front base cutters 38) may be necessary. When one set of base cutters (e.g., rear base cutters 34) is not needed, it may be useful to utilize other harvesting devices in its place. For example, for certain row spacings of sugarcane, the rear base cutters 34 may tend to serve only to pick up sugarcane already cut by the front base cutters 38 and to route the cut sugarcane further back into the feed train of the harvester 20. Among other issues, this use of the rear base cutters 34 may increase the likelihood of losses due to double cuts of the sugarcane. Accordingly, it may be useful to substitute a different harvesting device (e.g., a set of feed rollers) for the base cutters 34.

In certain embodiments, the disclosed modular assembly may facilitate this substitution (and others). A module cavity may be a space defined, at least in part, by the chassis 22 within which a harvesting device may be oriented and need not include a fully enclosed space, complete top and bottom walls, or a particular configuration of supports. By including a module cavity in the chassis 22, along with corresponding mounting locations, space may be provided for relatively simple interchange of various harvesting devices, depending on current harvesting needs.

In the embodiment depicted, for example, the chassis 22 may be configured to include a module cavity 180 that is located generally behind the front base cutters 38 (e.g., behind and below the upper and lower mounting structures 80 and 90 (see FIG. 1). The module cavity 180 may be viewed as a generally open space between various structures (e.g., various support beams, tubes and so on) of the chassis 22. As depicted, the module cavity 180 may be generally between the front base cutters 38 and the initial feed rollers 40 and 42 of the feed train (see FIG. 1). Different support modules for various harvesting device (or "harvesting device support modules") may be configured to mount to the chassis 22, such that associated harvesting devices may be oriented within the module cavity 180. In this way, various different harvesting devices may operate within the module cavity 180, depending upon which harvesting device module is currently mounted to the chassis 22.

Various types of harvesting device support modules may be provided. As depicted in FIG. 6A, a rear base cutter support module 170 may include a support structure 172 supporting the rear base cutters 34. The support structure 172 may be configured such that the base cutters 34 are generally oriented within the module cavity 180 when the support structure 172 is mounted to the chassis 22. As depicted in FIG. 6B, a feed roller support module 174 may include a support structure 176 supporting various feed rollers 178. The support structure 176 may be configured such that the feed rollers 178 are generally oriented within the module cavity 180 when the support structure 176 is mounted to the chassis 22. In certain embodiments, the chassis 22, the module cavity 180, and the various related harvesting device modules (e.g., modules 170 and 174) may be configured such when the various modules are mounted to the chassis 22 the associated harvesting devices are aligned to pass sugarcane material to downstream components of the feed train (e.g., feed rollers 40 and 42, as depicted in FIG. 1).

When the rear base cutters 34 are needed (e.g., as may depend on field conditions or layout, the sugarcane itself, the configuration of the front support modules 70 and 112, and so on), the support module 170 may be attached to the chassis 22 such that the rear base cutters 34 are oriented within the module cavity 180. The harvester 20 may then be operated with the base cutters 34 being utilized to cut sugarcane from the ground, to route already-cut sugarcane from the base cutters 38 farther into the harvester 20, and so on. When the rear base cutters 34 are not needed, however, or when other harvesting devices may be more useful, the support module 170 may be detached from the chassis 22 and a different harvesting device support module installed. For example, the base cutter support module 170 may be removed and the feed roller support module 174 attached in its place (e.g., using the same mounting locations on the chassis 22). The harvester 20 may then be operated with the feed rollers 178 serving to route cut sugarcane farther into the harvester 20.

Other modularity and configurations are also possible. In certain embodiments, it may be possible to move the tracks 24 (or wheels (not shown)) with respect to the chassis 22 (or vice versa) to further customize the harvester 20 to a particular set of operations. This may be useful, for example, in order to vary the lateral spacing between various left- and right-side tracks 24 (or wheels, and so on). As depicted in FIGS. 6A and 6B, various actuators 184 may be mounted to the chassis 22 and to the track frame 60 (or other relevant structure). The actuators 184 may be utilized to vary the distance between the right- and left-side tracks 24, as appropriate. In certain embodiments, separate right- and left-side track carriages (not shown) may support the tracks 24 with respect to a single track frame 60, and the actuators 184 may be utilized to move each of the track carriages laterally along a single track frame 60. In certain embodiments, the track frame 60 may be separated into separate right- and left-side frames (not shown), each supporting an associated track 24. In such a case, the actuators 184 may move each of the separate side frames with respect to the chassis 22.

In light of the discussion above, it will be understood that the various support modules may be utilized in various combinations in order to optimally configure the harvester 20 for a variety of field and crop arrangements. For example, through selective use and arrangement of the support modules 70, 112, 170 and 174 (and others), appropriate spacing for the crop dividers 32 may be obtained, as well as appropriate orientations and combinations of various base cutters 38 and 34, feed rollers 178, and other devices.

With regard to these and other configurations of harvesting devices (and the harvester 20 in general), it may be useful to implement various control strategies during harvester operation. When two sets of base cutters are to be utilized, for example, it may be useful to actively control the orientation of one or both of the sets in order to improve the effectiveness and efficiency of sugarcane cutting and transport. In certain embodiments, the orientation of each of the front and rear base cutters 38 and 34 may be actively adjusted, with respect to the ground, the chassis 22 and the other of the base cutters 34 and 38. This may, for example, allow for close tracking of ground contours with the base cutters 34 and 38, for effective cutting of sugarcane plants, as well as appropriate alignment of the base cutters 34 and 38 with respect to each other, for effective transport of cut sugarcane across the base cutters 34 and 38 to the feed train of the harvester 20.

A base cutter control ("BCC") method may provide this and other functionality. Such a method (and others) may be implemented automatically (e.g., as controlled by the controller 58), manually (e.g., as controlled by an operator via various interfaces and input devices (not shown)), or as a combination of automatic and manual operations (e.g., as controlled manually by an operator via various input devices and automatically by the controller 58). It will be understood, accordingly, that a BCC method may be implemented using various computing devices or by various hydraulic, electronic, mechanical, electro-hydraulic, electro-mechanical, or other control devices, in various combinations. In certain embodiments, a BCC method (or portions thereof) may be implemented by controllers or other devices that are remotely located from a relevant harvester.

In certain embodiments, a BCC method may be implemented with respect to the sugarcane harvester 20, or another harvester with a similar modular configuration. It will be understood, however, that a BCC method may also be implemented with respect to non-modular harvesters, so long as the harvesters include appropriately adjustable base cutter assemblies. Similarly, a BCC method may be implemented with respect to the example crop dividers 32 and related support module 70 described above. It will be understood, however, a BCC method may also be implemented with respect to other crop divider assemblies and configurations.

Figure 7:
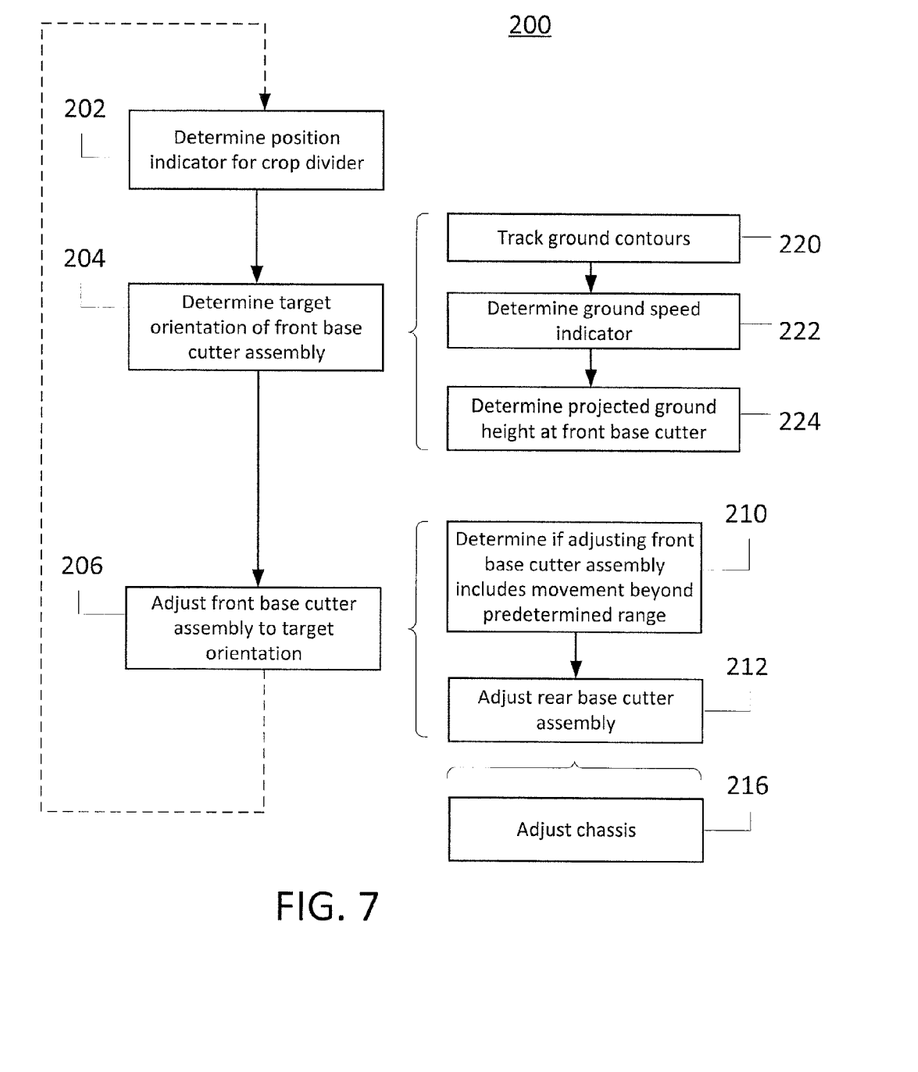
FIG. 7 is a diagrammatic view of a base cutter control method, which may be implemented by the base cutter control system of FIG. 1.

Referring also to FIG. 7, an example BCC method 200 is depicted. An example implementation of the method 200 with respect to the harvester 20 is described in detail below. It will be understood, however, that other implementations may be possible, including with respect to other harvesters.

During operation of the harvester 20, the method 200 may include determining an indicator of ground height with respect to the chassis 22, one or both of the crop dividers 32, and so on. In certain embodiments, this may include determining 202 the current position of one or both of the crop dividers 32 with respect to the ground. For example, the controller 58 may receive a signal from the position sensor 144, the signal indicating a current orientation of the lower link 136 supporting the crop divider 32. Because the crop dividers 32 may be configured to float with respect to the chassis (e.g., as facilitated by the crop divider support modules 70) in order to track local ground contours, the current orientation of each crop divider 32 may generally correspond to the current ground height at the toe (or other feature) of that crop divider 32. Accordingly, the controller 58 may interpret position signals from the sensor 144 as corresponding to the local, current ground height at the crop divider 32 supported by the link 136. In certain embodiments, the left- and right-side crop dividers 32 may track the ground independently of each other. In such a case, an indicator of current position (or, generally, of current ground height) may be determined 202 independently for each of the crop dividers 32. In this way, for example, the left- and right-side base cutters 34 and 38 may be controlled independently from each other.

Based upon the determined 202 indicator of the position of a particular crop divider 32, a target orientation for an associated base cutter (or base cutters) may then be determined 204 and the base cutter(s) adjusted 206 to that orientation. For example, based upon the current position of the right-side crop divider 32, as determined via the sensor 144, a target orientation for the right-side front base cutter 38 may be determined 204 that will provide a particular clearance between this base cutter 38 and the ground. The actuator 162 may then be commanded to adjust 206 the support arm 158 until the base cutter 38 is in the appropriate determined 204 orientation.

In certain embodiments, as also described above, the front base cutters 38 may be pivotably (or otherwise movably) mounted to the chassis 22, whereas the rear base cutters 34 may be fixedly mounted to the chassis (e.g., with one of a number of predetermined cutting angles). Further, the chassis 22, along with the rear base cutters 34, may be pivoted (or otherwise moved) with respect to the relevant transport frame (e.g., track frame 60) in order to adjust the orientation of the chassis 22 with respect to ground. In this and other configurations, the method 200 may include adjusting 206 the orientation of the front base cutters 38 directly, as well as adjusting 216 the general orientation of the chassis with respect to the ground.

In certain instances, for example, a range of movement of the base cutters 38 may be not be large to facilitate a needed adjustment to the orientation of the front base cutters 38. For example, a limit on the pivot range of the support arm 158 or on the linear extension or retraction of the actuator 162, with respect to the chassis 22, may limit the total adjustment 206 of the base cutters 38 that may be possible using only the arm 158 and the actuator 162. In certain embodiments, however, other aspects of the sugarcane harvester 20 may be adjusted in order to effectively change the range of motion for adjustment 206 of the front base cutters 38. As noted above, for example, the chassis 22 itself may be adjusted 216 (e.g., pivoted about a rear axle or track mount) in order to generally move (e.g., pivot) the base cutter support modules 112 and thereby change the effective range of motion of the base cutters 38.

In an example adjustment operation, it may be determined 210 that adjusting 206 the front base cutters 38 to a determined 204 target orientation may require adjusting 206 the front base cutters 38 beyond their current range of motion (e.g., as defined by the actuator 162 and the support arm 158). The effective range of motion of the front base cutter 38, however, may be changed by adjusting 212 the rear base cutter assembly (via adjustment 216 of the chassis 22). Accordingly, the orientation of the front base cutters 38 may be set both through direct adjustment 206 of the front base cutters 38 (e.g., via the support arm 158 and the actuator 162) as well as through adjustment 212 of the rear base cutter assembly 34 (via adjustment 216 of the chassis 22).

In certain implementations, the determined 202 position (or ground height) indicator may be utilized directly in order to determine 204 a target orientation for a base cutter assembly. For example, current ground height under one of the front base cutters 38, as identified based upon the determined 202 crop divider position, may be treated as being generally equal to the current ground height under the corresponding crop divider 32 (e.g., as determined 202 via position sensor 144).

In certain implementations, the method 200 may account for various other factors when determining 204 a target base cutter orientation. For example, as noted above, the method 200 may include tracking 220 contours of the ground under a forward portion of the crop dividers 32 (e.g., as based upon determined 202 position indicators for the crop dividers 32). The method 200 may also include determining 222 a current ground speed for the harvester 20, based upon input from various wheel-speed, engine-speed, or other sensors (not shown). Based upon the known distance between the forward portion of the crop dividers 32 and the base cutters 38, the tracked 220 ground contours at the crop dividers 32, and the determined 222 ground speed, projected ground heights at the base cutters 38 may be determined 224. For example, with a ground speed of 2 m/s and a distance of 1 meter between a toe of a crop divider 32 and the front of a base cutter 38, the current ground height at the toe of the crop divider 32 may be projected to be the ground height at the front of the base cutter 38 in 2 seconds. In this way, the ground height at the base cutter 38 may be determined 224 with some precision as the harvester 20 travels across a field, and a corresponding target orientation of the base cutter 38 may be determined 204.

In the depicted configuration of the harvester 20, it can be seen that the independently mounted, right- and left-side crop dividers 32, the independently mounted, right- and left-side front base cutters 38, and the rigidly mounted rear base cutters 34 together provide five potential contact points with the ground. As described above, despite this complexity, the BCC method 200 (and related control systems) may provide for effective control of the relative orientation of each of these points, such that efficient harvesting and processing may be executed without adverse ground impacts or other detrimental events.

It will be understood that various functionality of the BCC method 200 may be implemented automatically (e.g., as controlled by the controller 58). In certain implementations, various functionality (of the BCC method 200 and otherwise) may additionally (or alternatively) be implemented manually. For example, via various controls (not shown) within the cab 18, an operator may manually adjust the orientation of various base cutters 34 and 38.

As will be appreciated by one skilled in the art, certain aspects of the disclosed subject matter may be embodied as a method, system, (e.g., a work vehicle control system included in the harvester 20) or computer program product. Accordingly, certain embodiments may be implemented as hardware, as software (including firmware, resident software, micro-code, etc.), as a combination of software and hardware, or otherwise. Furthermore, certain embodiments may take the form of a computer program product on a computer-usable storage medium having computer-usable program code embodied in the medium.

Any suitable computer-usable or computer-readable medium may be utilized. The computer-usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer-readable signal medium may be non-transitory and may be any computer-readable medium that is not a computer-readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions (or otherwise). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Relevant computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Relevant computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, combinations of special purpose hardware and computer instructions, or otherwise.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A computer-implemented method for orientating one or more base cutters of a sugarcane harvester, the sugarcane harvester including a first crop divider, a rear base cutter, and a first front base cutter, each of the first front base cutter and the first crop divider being mounted to a chassis of the sugarcane harvester such that the first front base cutter and the first crop divider are separately and independently movable relative to one another with respect to the chassis during operation of the sugarcane harvester, the method comprising:
    determining, by one or more computing devices, an indicator of a position of the first crop divider;
    determining, by the one or more computing devices, a first target orientation of the first front base cutter based upon, at least in part, the indicator of the position of the first crop divider;
    adjusting, by the one or more computing devices, the first front base cutter, with respect to the chassis, to place the first front base cutter in the first target orientation; and
    when the adjusting of the first front base cutter to the first target orientation includes movement of the first front base cutter beyond a first predetermined range of motion, adjusting, by the one or more computing devices, the rear base cutter with respect to ground.

2. The method of claim 1, wherein the indicator of the position of the first crop divider is determined based upon, at least in part, information from a position sensor in communication with the first crop divider.

3. The method of claim 1, wherein the first crop divider is mounted to the chassis with a ground-tracking assembly, a portion of the first crop divider thereby moving with respect to the chassis during operation of the sugarcane harvester to track, at least in part, ground contours under the first crop divider, the indicator of the position of the first crop divider including an indicator of the ground contours under the portion of the first crop divider.

4. The method of claim 3, further comprising:
    determining a ground speed indicator for the sugarcane harvester; and
    determining a projected ground height at the first front base cutter based upon, at least in part, the determined ground speed indicator and the indicator of the ground contours under the first crop divider; and
    wherein the determining of the first target orientation of the first front base cutter is further based upon, at least in part, the projected ground height at the first front base cutter.

5. The method of claim 1, wherein the first front base cutter is mounted to the chassis with a pivot arm, the first front base cutter being thereby pivotally movable with respect to the chassis.

6. The method of claim 5, wherein the sugarcane harvester further includes a first hydraulic actuator configured to pivotally move the pivot arm and the first front base cutter with respect to the chassis.

7. The method of claim 1, wherein the rear base cutter is rigidly mounted to the chassis, the adjusting of the rear base cutter with respect to ground including moving the chassis with respect to ground.

8. The method of claim 1, wherein the chassis includes a plurality of mounting locations for rigidly mounting the rear base cutter to the chassis with, respectively, a plurality of cutting angles.

9. The method of claim 1, wherein the sugarcane harvester further includes a second front base cutter and a second crop divider, each of the second front base cutter and the second crop divider being mounted to the chassis such that the second front base cutter and the second crop divider are separately and independently adjustable relative to one another with respect to the chassis during operation of the sugarcane harvester, the method further comprising:
- determining an indicator of a position of the second crop divider;
- determining a second target orientation of the second front base cutter based upon, at least in part, the indicator of the position of the second crop divider;
- adjusting the second front base cutter, with respect to the chassis, to place the second front base cutter in the second target orientation; and
- when the adjusting of the second front base cutter includes movement of the second front base cutter beyond a second predetermined range, further adjusting the rear base cutter with respect to ground.

10. The method of claim 1, wherein the adjusting of the first base cutter includes an adjustment of the first base cutter with respect to the chassis using one or more of a slide assembly, a rail and roller assembly, a linear actuator, and a four bar linkage.

11. A control system for orientating one or more base cutters of a sugarcane harvester, the control system comprising:
- a rear base cutter mounted to a chassis of the sugarcane harvester;
- a first crop divider mounted to the chassis;
- a first front base cutter mounted to the chassis such that the first front base cutter and the first crop divider are separately and independently adjustable relative to one another with respect to the chassis during operation of the sugarcane harvester; and
- one or more controllers configured to:
    - determine a ground height indicator;
    - determine a first target orientation of the first front base cutter based upon, at least in part, the ground height indicator;
    - adjust the first front base cutter, with respect to the chassis, to place the first front base cutter in the first target orientation; and
    - when the adjusting of the first front base cutter to the first target orientation includes movement of the first front base cutter beyond a first predetermined range of motion, adjust the rear base cutter with respect to ground.

12. The control system of claim 11, further comprising a position sensor in communication with the first crop divider; and
- wherein the ground height indicator is determined based upon, at least in part, information from the position sensor.

13. The control system of claim 11, wherein the first crop divider is mounted to the chassis with a ground-tracking assembly, a portion of the first crop divider thereby moving with respect to the chassis during operation of the sugarcane harvester to track, at least in part, ground contours under the first crop divider, the ground height indicator including an indicator of the ground contours under the portion of the first crop divider.

14. The control system of claim 13, wherein the one or more controllers are further configured to:
- determine a ground speed indicator for the sugarcane harvester; and
- determine a projected ground height at the first front base cutter based upon, at least in part, the determined ground speed indicator and the indicator of the ground contours under the first crop divider; and
- wherein the determining of the first target orientation of the first front base cutter is further based upon, at least in part, the projected ground height at the first front base cutter.

15. The control system of claim 14, wherein the first front base cutter is mounted to the chassis with a pivot arm, the first front base cutter being thereby pivotally movable with respect to the chassis.

16. The control system of claim 15, further comprising:
- a first hydraulic actuator configured to pivotally move the pivot arm and the first front base cutter with respect to the chassis.

17. The control system of claim 11, wherein the rear base cutter is rigidly mounted to the chassis, the adjusting of the rear base cutter with respect to ground including moving the chassis with respect to ground.

18. The control system of claim 11, wherein the chassis includes a plurality of mounting locations for rigidly mounting the rear base cutter to the chassis with, respectively, a plurality of cutting angles.

19. The control system of claim 11, further comprising:
- a second crop divider mounted to the chassis; and
- a second front base cutter mounted to the chassis such that the second front base cutter and the second crop divider are separately and independently adjustable relative to one another with respect to the chassis during operation of the sugarcane harvester
- wherein the one or more controllers are further configured to:
- determine an indicator of a position of the second crop divider;
- determine a second target orientation of the second front base cutter based upon, at least in part, the indicator of the position of the second crop divider;
- adjust the second front base cutter, with respect to the chassis, to place the second front base cutter in the second target orientation; and
- when the adjusting of the second front base cutter to the second target orientation includes movement of the second front base cutter beyond a second predetermined range, adjust the rear base cutter with respect to ground.

20. The control system of claim 11, wherein the adjusting of the first base cutter includes an adjustment of the first base cutter with respect to the chassis using one or more of a slide assembly, a rail and roller assembly, a linear actuator, and a four bar linkage.

* * * * *